United States Patent [19]

Spector et al.

[11] Patent Number: 4,765,413

[45] Date of Patent: Aug. 23, 1988

[54] FIRE AND EXPLOSION DETECTION APPARATUS

[75] Inventors: Yehiel Spector, Tel-Aviv; Ilan Cohen, Tikva, both of Israel

[73] Assignee: Spectronix, Ltd., Tel-Aviv, Israel

[21] Appl. No.: 872,642

[22] Filed: Jun. 10, 1986

Related U.S. Application Data

[63] Continuation of Ser. No. 490,246, Apr. 29, 1983, abandoned.

[30] Foreign Application Priority Data

May 7, 1982 [IL] Israel ........................................ 65715

[51] Int. Cl.[4] ........................... A62C 37/18; G01J 1/00

[52] U.S. Cl. ........................................ 169/61; 169/62; 250/342; 250/349; 250/372

[58] Field of Search ........................ 169/56, 60, 61, 75; 250/342, 349, 372

[56] References Cited

U.S. PATENT DOCUMENTS

| | | | |
|---|---|---|---|
| 3,653,016 | 3/1972 | Cormier . | |
| 4,101,767 | 7/1978 | Lennington et al. | 250/349 X |
| 4,270,613 | 5/1981 | Spector et al. | 169/61 |
| 4,357,534 | 11/1982 | Ball | 250/349 X |
| 4,373,136 | 2/1983 | Ball | 250/349 X |
| 4,455,487 | 6/1984 | Wendt | 250/372 X |
| 4,469,944 | 9/1984 | Kern et al. | 250/349 X |

*Primary Examiner*—Andres Kashnikow
*Attorney, Agent, or Firm*—Browdy and Neimark

[57] ABSTRACT

Detection apparatus comprising UV sensing apparatus, IR sensing apparatus, inhibitible AND gate logic apparatus operative to receive outputs from the UV sensing apparatus and the IR sensing apparatus and being operative unless inhibited by receipt of an inhibit signal to produce an output signal in response to simultaneous detection by the UV and IR sensing apparatus, and inhibit signal generating apparatus operative to produce an inhibit signal in response to characteristics of the UV sensed by the UV sensing apparatus.

5 Claims, 6 Drawing Sheets

FIRE AND EXPLOSION DETECTION APPARATUS

CROSS-REFERENCE TO RELATED APPLICATIONS

This application is a continuation of application Ser. No. 490,246 filed Apr. 29, 1983, now abandoned.

FIELD OF THE INVENTION

The present invention relates to fire and explosion detection apparatus generally and more particularly to detection apparatus having UV and IR detectors.

BACKGROUND OF THE INVENTION

There are known a number of fire and explosion detection systems employing UV and IR detectors in combination. Examples of such systems are illustrated in the following U.S. Pat. Nos. 3,665,440; 3,653,016. The apparatus described in U.S. Pat. No. 3,665,440 provides an alarm output when IR is detected in the absence of UV. The apparatus described in U.S. Pat. No. 3,653,016 provides an alarm output when IR and UV are detected together but also includes a portion of the visible spectrum in the detection ranges of the detectors.

U.S. Pat. No. 4,270,613 of the present applicant/assignee describes a particularly useful detection system which provides an output indication in response to coincident detection of UV and IR wherein the detection bands exclude the visible spectrum.

SUMMARY OF THE INVENTION

The present invention seeks to provide combination UV and IR detection circuitry which is sensitive to characteristics of the UV input, such as its duration and its level.

There is thus provided in accordance with an embodiment of the present invention detection apparatus comprising UV sensing apparatus, IR sensing apparatus, inhibitible AND gate logic means operative to receive outputs from the UV sensing apparatus and the IR sensing apparatus and being operative unless inhibited by receipt of an inhibit signal to produce an output signal in response to simultaneous detection by the UV and IR sensing apparatus, and inhibit signal generating means operative to produce an inhibit signal in response to characteristics of the UV sensed by the UV sensing apparatus.

Further in accordance with an embodiment of the present invention, the inhibit signal generating means comprises means for discriminating between different predetermined levels of received UV radiation and means for producing an inhibit signal in response to the presence of UV radiation at above a predetermined level.

Additionally in accordance with an embodiment of the present invention, the inhibit signal generating means comprises means for sensing the rate of change in the IR radiation sensed by the IR sensing apparatus and means for generating an inhibit signal when the rate of change in the IR radiation is below a predetermined positive limit.

The apparatus described hereinabove is particularly useful for discriminating between entry of certain kinds of projectiles such as HEAT rounds, hollow charges and kinetic energy rounds and hydrocarbon fires produced thereby. This discrimination is useful since it is normally desired to activate suppression apparatus to a maximal extent only in the event that hydrocarbon fires have been produced.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1:
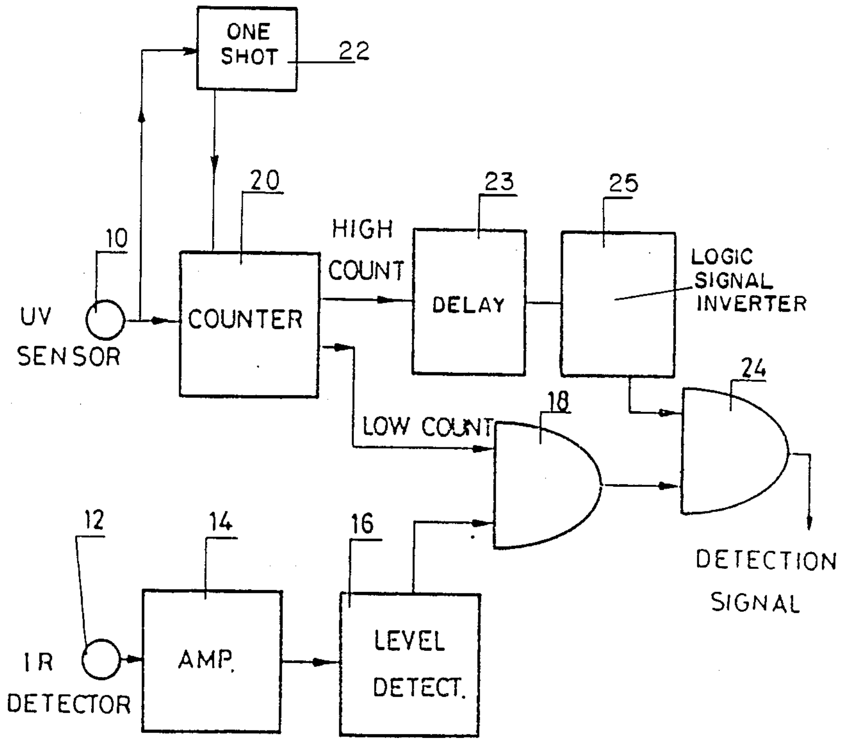
FIG. 1 is a block diagram illustration of detection apparatus constructed and operative in accordance with an embodiment of the present invention.

Reference is now made to FIG. 1 which is a block diagram illustration of detection apparatus constructed and operative in accordance with an embodiment of the present invention. There are provided at least one UV sensor 10 such as an R1490 operating in a wavelength range of 0.18–0.26 μm and at least one IR sensor 12, such as an RPY 76 PHILIPS operating in a wavelength range of 1–3 μm.

The output of the IR sensor 12 is supplied to an amplifier 14 and thence to a level detector 16 which outputs to a first AND gate 18. The output of UV sensor 10 is supplied to a counter 20 associated with a One-Shot circuit 22 of conventional construction and which provides a HIGH COUNT output to a Delay Circuit 23 and a LOW COUNT output to AND gate 18. The output of Delay Circuit 23, after being inverted at Logic Signal Inverter 25, is supplied to a second AND gate 24 together with the output of the AND gate 18. The output of AND gate 24 provides a detection signal for operation of suppression apparatus, not shown, and is characteristic of the presence of hydrocarbon fire.

Figure 2:
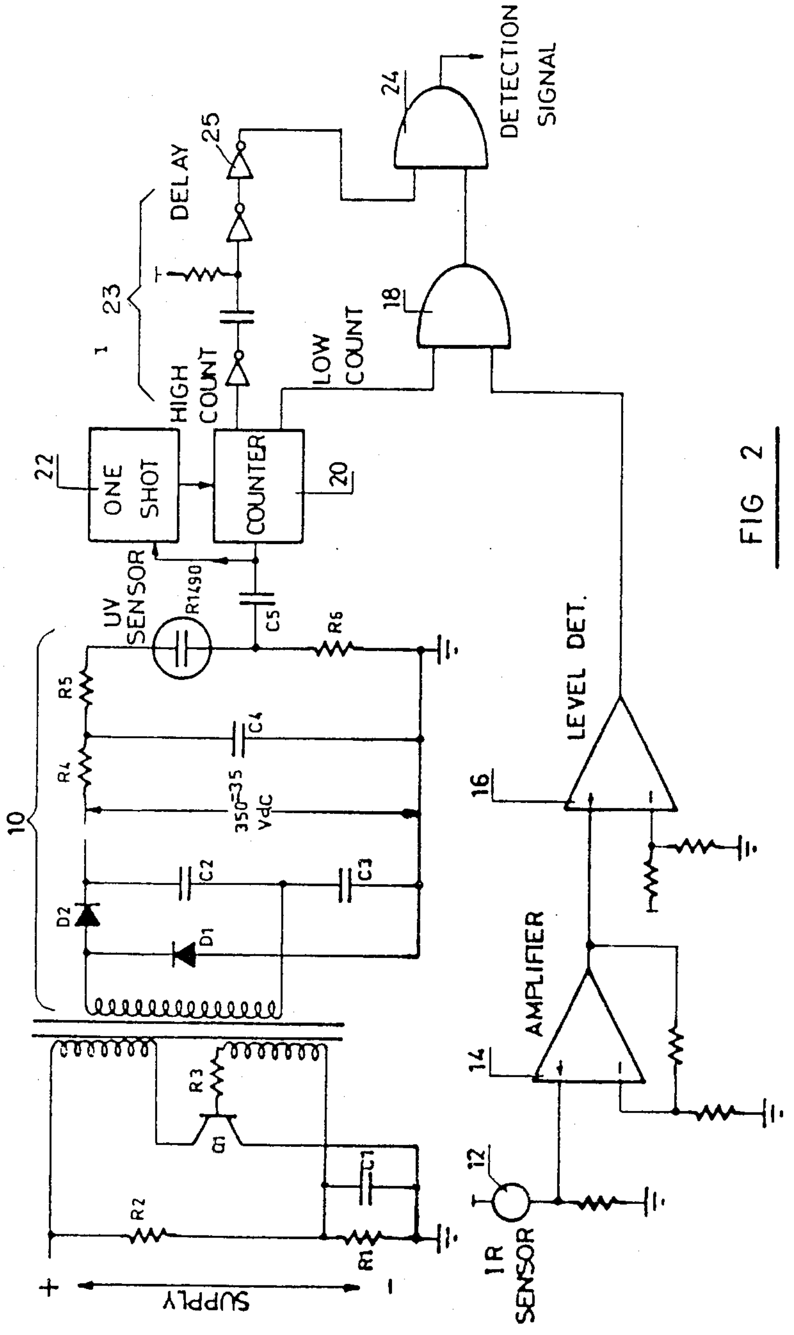
FIG. 2 is a schematic illustration of the apparatus of FIG. 1.

FIG. 2 is a schematic illustration of the apparatus of FIG. 1 in accordance with a preferred embodiment of the present invention, the same reference numerals being used to denote corresponding circuitry elements.

Figure 3:
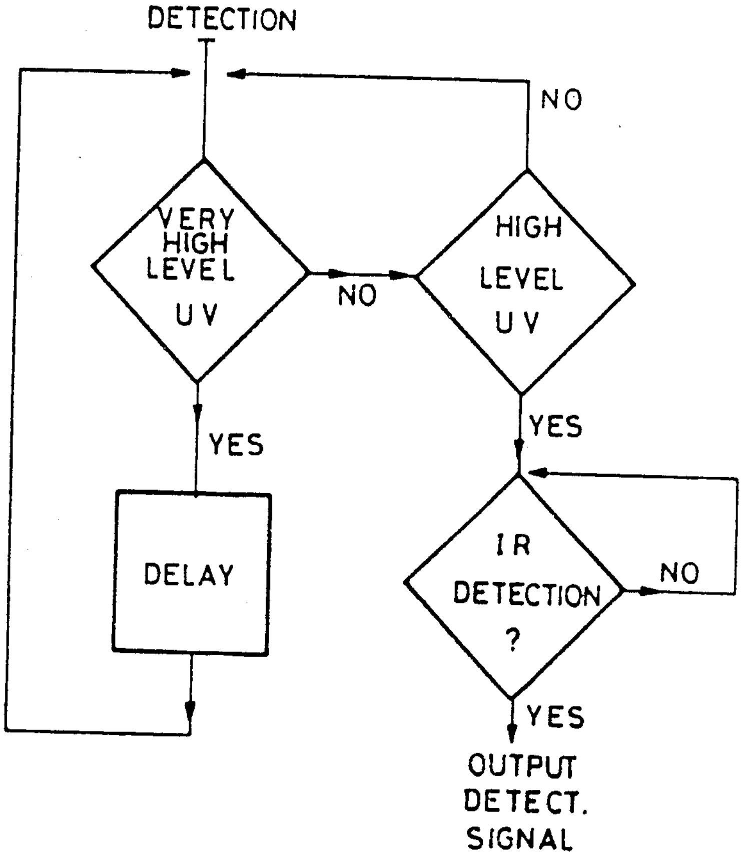
FIG. 3 is a logic diagram illustration of the apparatus of FIG. 1 in operation.

The operation of the apparatus of FIGS. 1 and 2 will now be described in connection with FIG. 3. The output of the UV sensor is analyzed to determine its level. If a predetermined very high level, such as 8–10 counts/millisecond by a UV sensor such as an R 1490, is found, a predetermined delay is imposed on a detection output. This delay is typically at least 15 msec but is renewed so long as the UV detection exceeds the predetermined very high level. Once the UV detection falls below the very high level, it is determined whether the detection level is above a predetermined minimum level, such as 0.1 counts/millisec. If not, the cycle begins again. If so, it is determined whether IR detection over a predetermined minimum level is present. If so, a detection signal is produced.

Figure 4:
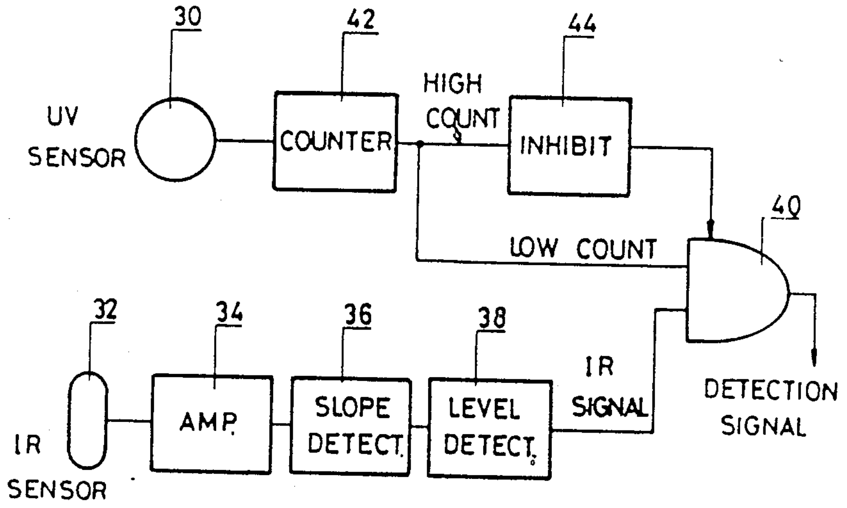
FIG. 4 is a block diagram illustration of an alternative embodiment of detection apparatus constructed and operative in accordance with an embodiment of the present invention.

Reference is now made to FIG. 4 which is a block diagram illustration of an alternative embodiment of detection apparatus constructed and operative in accordance with an alternative embodiment of the present invention. This apparatus comprises at least one UV sensor 30 and at least one IR sensor 32.

The IR sensor 32 outputs to an amplifier 34 and the output of the amplifier 34 is supplied to a slope detector 36. The output of the slope detector 36 is supplied to a level detector 38 which outputs to an AND gate 40. The output of UV sensor 30 is supplied to a counter 42. Counter 42 provides a HIGH COUNT output to an INHIBIT CIRCUIT 44 and a LOW COUNT output to AND gate 40. AND gate 40 provides a detection signal in the absence of operation of the INHIBIT circuitry.

Figure 5:
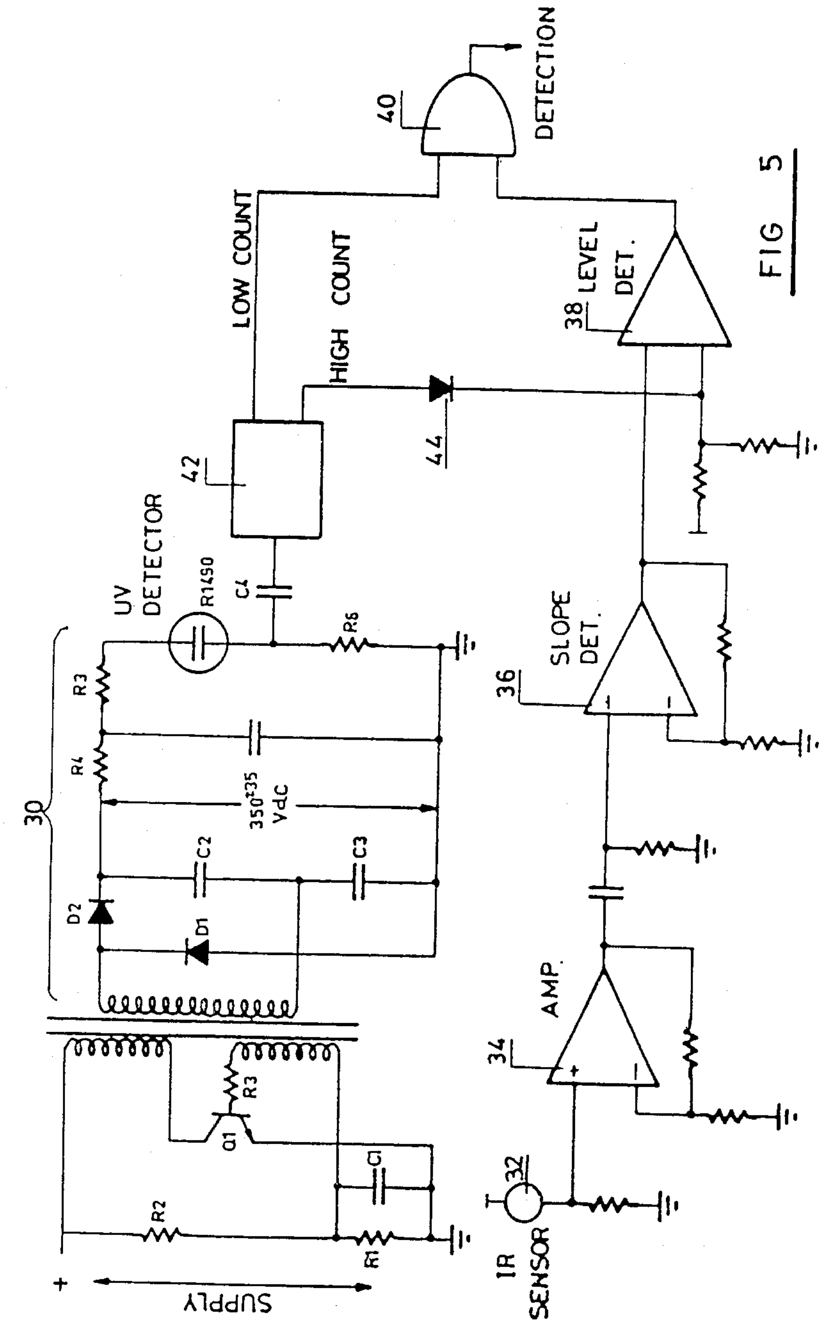
FIG. 5 is a schematic illustration of the apparatus of FIG. 4.

Reference is now made to FIG. 5 which is a schematic illustration of the circuitry of FIG. 4, the same reference numerals being used for identical circuit elements.

The operation of the circuitry of FIGS. 4 and 5 will now be described with reference to FIG. 6 which is a logic diagram of the operation of this circuitry.

Figure 6:
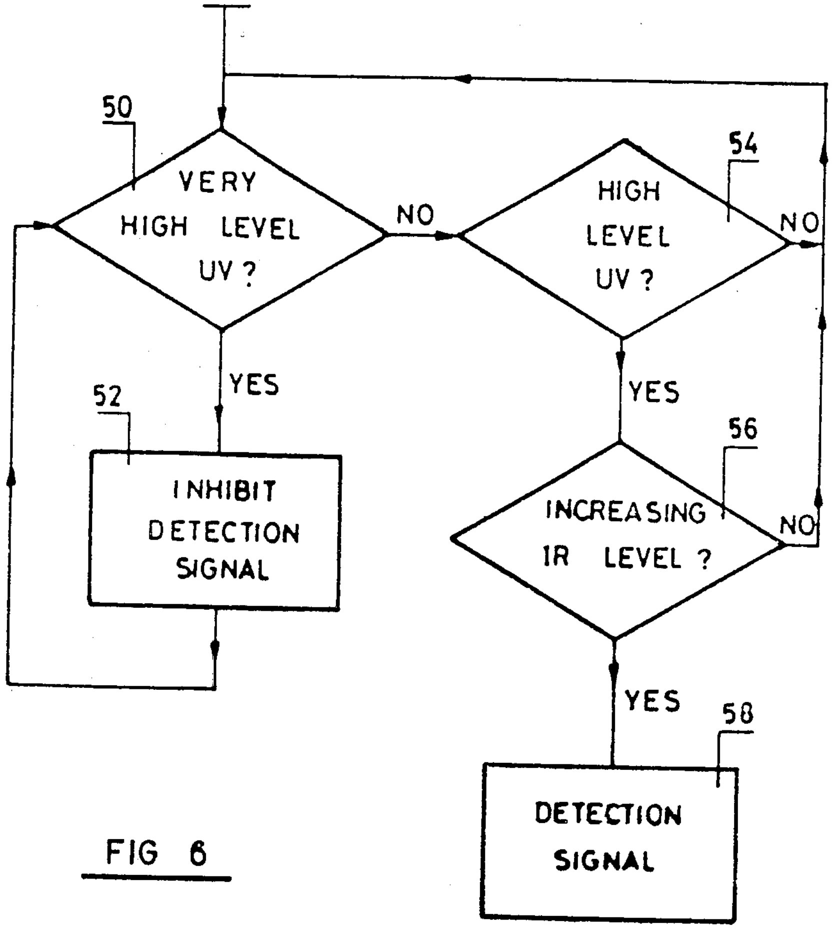
FIG. 6 is a logic diagram illustration of the apparatus of FIG. 4 in operation.

Reference is now made to FIG. 6 which is a logic diagram illustrating operation of the circuitry of FIGS. 4 and 5. An incoming detection signal is examined at 50 to determine whether a very high level of UV radiation is present. If yes, an INHIBIT detection signal is provided at 52. This INHIBIT signal continues so long as the very high level UV radiation detection continues. If a very high level of UV radiation detection is not found, enquiry is made at 54 as to whether a high level of UV radiation is present, this high level being lower than the very high level mentioned previously. If such a high level of UV radiation is enquiry is made at 54 as to whether a high level, such as 2-3 counts/millisecond by a U.V. sensor such as an R. 1490, of UV radiation is present, this high level being lower than the very high level mentioned previously. If such a high level of UV radiation is found to be present, an enquiry is next made at 56 to determine whether the rate of increase in IR radiation is at least above a predetermined level indicative of hydrocarbon combustion. If yes, a detection signal is provided at 58 for operation of suppression apparatus.

In the event that either the UV level does not reach the predetermined high level, or that the rate of increase of the IR radiation is below the predetermined threshold, no detection signal is provided and the interrogation cycle described above begins anew.

It will be appreciated by persons skilled in the art that the present invention is not limited to what has been particularly shown and described hereinabove. Rather the scope of the present invention is defined only by the claims which follow:

We claim:

1. Detection apparatus, comprising:

UV sensing means for sensing the presence of UV radiation and generating an output signal proportionate to the level of said UV radiation sensed;

IR sensing means for sensing the presence of IR radiation and generating a first output signal proportionate to the level of said IR radiation sensed; and logic means for generating a detection signal only when the level of the output signal from said UV sensing means is between predetermined upper and lower limits, and when the level of said first output signal from said IR sensing means exceeds a predetermined limit.

2. Detection apparatus in accordance with claim 1, wherein said IR sensing means further includes means for determining the rate of increase of said IR radiation sensed, and said logic means generates a detection signal only when all three of the following conditions are present:

(1) the level of the output signal from said UV sensing means is between predetermined upper and lower limits, (2) the level of IR radiation sensed by said IR sensing means exceeds a predetermined limit, and (3) the rate of increase of said IR radiation as determined by said rate determining means in above a predetermined limit.

3. Detection apparatus in accordance with claim 1, wherein said logic means includes means for generating a positive logic signal when the level of the output signal from said UV sensing means exceeds a predetermined lower limit, means for generating a positive logic signal when the level of said first signal from said IR sensing means exceeds a predetermined limit, means for generating an inhibit signal when the level of the output signal from said UV sensing means exceeds said predetermined upper limit, and AND gate means for issuing a detection signal only when both of said logic signals are positive and said inhibit signal is absent.

4. Detection apparatus comprising:

UV sensing means for sensing the presence of UV radiation and generating an output signal proportionate to the level of said UV radiation sensed;

IR sensing means for sensing the presence of IR radiation and generating an output signal proportionate to the level of said IR radiation sensed;

level determining means for determining the level of output signal from said UV sensing means and for generating a first output signal when said level exceeds a predetermined high level and for generating a second output signal when said level exceeds a predetermined very high level which is higher than said predetermined high level;

IR signal means for generating an IR signal when the output signal from said IR sensing means is determined to have a predetermined characteristic;

logic means for generating a detection signal only when said IR signal is present simultaneously with said first output signal from said level determining means but no said second output signal from said level determining means is present.

5. Detection apparatus in accordance with claim 4, wherein said IR signal means includes means to sense the rate of change of the output signal generated by said IR sensing means and generating said IR signal only when said rate of change is above a predetermined positive limit, and the level of IR radiation sensed is above a predetermined lower limit.

* * * * *